United States Patent [19]

Mihara et al.

[11] Patent Number: 5,204,935
[45] Date of Patent: Apr. 20, 1993

[54] PROGRAMMABLE FUZZY LOGIC CIRCUITS

[75] Inventors: Tohru Mihara; Mitsumasa Narahara; Yasunao Misawa; Yasuo Wakamori; Shinichi Yasunaga, all of Kanagawa, Japan

[73] Assignee: Fuji Xerox Co., Ltd., Tokyo, Japan

[21] Appl. No.: 865,748

[22] Filed: Apr. 10, 1992

Related U.S. Application Data

[63] Continuation of Ser. No. 394,483, Aug. 16, 1989, abandoned.

[30] Foreign Application Priority Data

Aug. 19, 1988 [JP] Japan .................................. 63-206201
May 1, 1989 [JP] Japan .................................. 1-112694

[51] Int. Cl.$^5$ ................................................ G06G 7/12
[52] U.S. Cl. ........................................... 395/3; 395/61; 395/900
[58] Field of Search ........................... 395/3, 900, 61

[56] References Cited

U.S. PATENT DOCUMENTS

| | | | |
|---|---|---|---|
| 4,395,752 | 7/1983 | Hirosawa | 364/130 |
| 4,706,217 | 11/1987 | Shimizu et al. | 365/154 |
| 4,875,184 | 10/1989 | Yamakawa | 364/807 |
| 5,012,430 | 4/1991 | Sakurai | 364/513 |

FOREIGN PATENT DOCUMENTS 59-27624 2/1984 Japan .
61-221938 10/1986 Japan .
62-95673 5/1987 Japan .

OTHER PUBLICATIONS

Hamacher et al., Computer Organization, McGraw-Hill, 1984, pp. 305-306, 493-499, 531-533.
Zadeh, L. A., "Fuzzy Logic", Computer, Apr. 1988, pp. 83-93.
Yamakawa et al., "Fuzzy Memory Device", 2nd IFSA Congress, Jul. 1987, pp. 551-555.
Yamakawa, T., "A Simple Fuzzy Computer Hardware System Employing Min & Max Operations", 2nd IFSA Congress, Jul. 1987, pp. 827-830.
Togai et al., "Expert System on a Chip: An Engine for Real-Time Approximate Reasoning", IEEE Expert, Fall 1986, pp. 55-62.
Hamacher et al., Computer Organization, McGraw-Hill Book Co., 1984, p. 530.
H. R. van Nauta Lemke et al., "Fuzzy PID Supervisor", 24th IEEE Conf. Decision & Control, Dec. 1985, pp. 602-608.
Mamdani et al., "Process Control Using Fuzzy Logic", Fuzzy Sets-Theory and Applications to Policy Analysis and Information Systems, Plenum, 1980, pp. 249-265.
Larsen, P. M., "Industrial Applications of Fuzzy Control", Intl. J. Man-Machine Studies, 12, 1980, pp. 3-10.
A VLSI Implementation of Fuzzy Inference Engine: Toward An Expert System On A Chip; Proc. 2nd Conf. on Art. Int. Appli, pp. 192-197, Miami Beach (1985); M. Togai and H. Watanabe.

*Primary Examiner*—Michael R. Fleming
*Assistant Examiner*—Robert W. Downs
*Attorney, Agent, or Firm*—Finnegan, Henderson, Farabow, Garrett and Dunner

[57] ABSTRACT

A fuzzy logic circuit for operating a fuzzy logic with "fuzziness" taken into account has an operation section memory unit in which the result of operation to be outputted in response to an input is stored in an address specified by the input, the result of operation being rewritable, whereby the change in the contents of a fuzzy logic operation to be performed can be handled merely by rewriting the contents of the operation section memory unit.

5 Claims, 5 Drawing Sheets

FIG. 3(a)
|    | a | b | c | d |
|----|---|---|---|---|
| $A_6$ | 0 | 0 | 1 | 1 |
| $A_7$ | 0 | 1 | 0 | 1 |
FIG. 3(b)
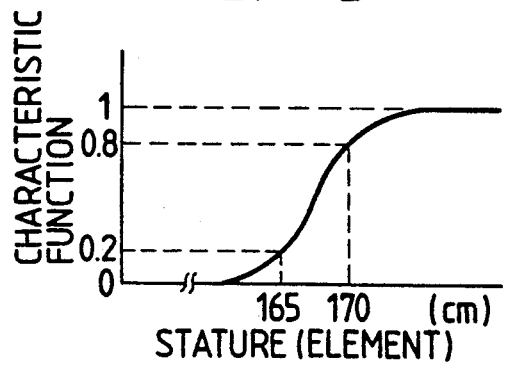
FIG. 4
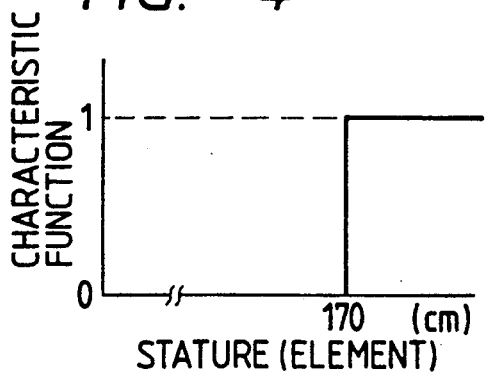
FIG. 5
FIG. 6
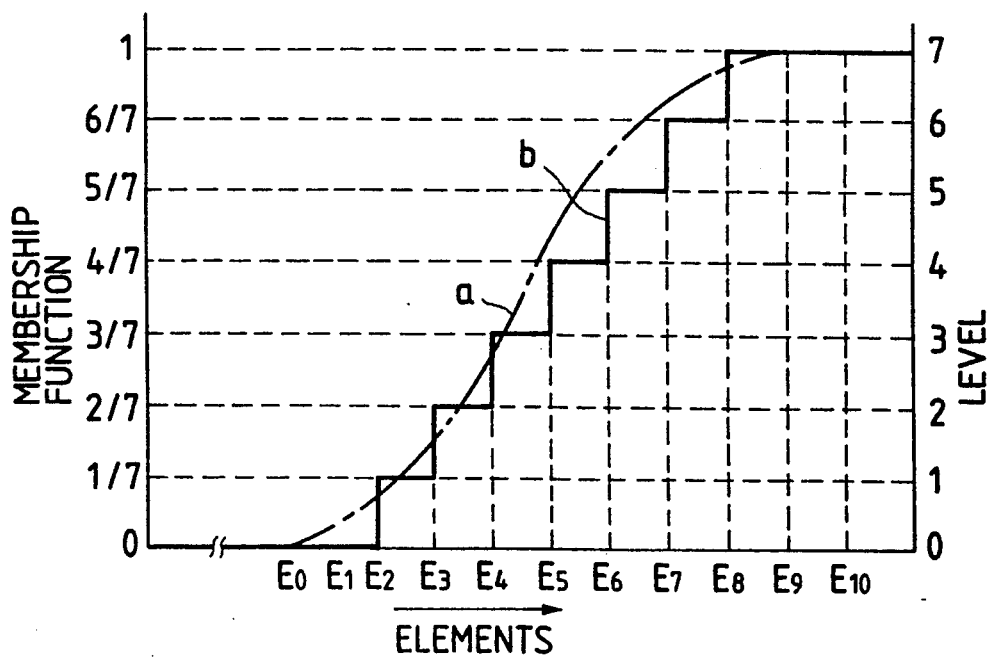

| NO.6 FIRST INPUT | SECOND INPUT | |
|---|---|---|
| | 0 | 1 |
| 0 | 0 | 1 |
| 1 | 0 | 1 |

| NO.12 FIRST INPUT | SECOND INPUT | |
|---|---|---|
| | 0 | 1 |
| 0 | 1 | 0 |
| 1 | 1 | 1 |

| FIRST INPUT | SECOND INPUT | OUTPUT | | | | | | | | | | | | | | |
|---|---|---|---|---|---|---|---|---|---|---|---|---|---|---|---|---|
| | | NO. 1 | 2 | 3 | 4 | 5 | 6 | 7 | 8 | 9 | 10 | 11 | 12 | 13 | 14 | 15 | NO. 16 |
| 0 | 0 | 0 | 0 | 0 | 0 | 0 | 0 | 0 | 0 | 1 | 1 | 1 | 1 | 1 | 1 | 1 | 1 |
| 0 | 1 | 0 | 0 | 0 | 0 | 1 | 1 | 1 | 1 | 0 | 0 | 0 | 0 | 1 | 1 | 1 | 1 |
| 1 | 0 | 0 | 0 | 1 | 1 | 0 | 0 | 1 | 1 | 0 | 0 | 1 | 1 | 0 | 0 | 1 | 1 |
| 1 | 1 | 0 | 1 | 0 | 1 | 0 | 1 | 0 | 1 | 0 | 1 | 0 | 1 | 0 | 1 | 0 | 1 |

| FIRST INPUT'S LEVEL (3 LOW-ORDER BITS) | SECOND INPUT'S LEVEL (3 HIGH-ORDER BITS) | | | | | | | |
|---|---|---|---|---|---|---|---|---|
| | | 0 | 1 | 2 | 3 | 4 | 5 | 6 | 7 |
| | 0 | 0 | 0 | 0 | 0 | 0 | 0 | 0 | 0 |
| | 1 | 0 | 1 | 1 | 1 | 1 | 1 | 1 | 1 |
| | 2 | 0 | 1 | 2 | 2 | 2 | 2 | 2 | 2 |
| | 3 | 0 | 1 | 2 | 3 | 3 | 3 | 3 | 3 |
| | 4 | 0 | 1 | 2 | 3 | 4 | 4 | 4 | 4 |
| | 5 | 0 | 1 | 2 | 3 | 4 | 5 | 5 | 5 |
| | 6 | 0 | 1 | 2 | 3 | 4 | 5 | 6 | 6 |
| | 7 | 0 | 1 | 2 | 3 | 4 | 5 | 6 | 7 |

PROGRAMMABLE FUZZY LOGIC CIRCUITS

This application is a continuation of application Ser. No. 07/394,483, filed Aug. 16, 1989, now abandoned.

BACKGROUND OF THE INVENTION

This invention relates to a circuit for operating a fuzzy logic.

The fuzzy logic is a logic to handle "fuzziness" which is based on the fuzzy set proposed by L. A. Zadeh in 1965.

The considerations and actions of a human being are generally fuzzy. Therefore, the operation of a machine, with the fuzziness similar to that of a human being cannot be completely achieved by conventional control techniques which do not permit fuzziness.

However, if there is a way to express the fuzziness logically or quantitatively by the fuzzy logic, then the considerations and actions of a human being which have been expressed on the experience or perception, can be automated. Therefore, recently research has been extensively conducted on it.

First, the difference between a conventional set (crisp set) and the fuzzy set will be described with reference to FIGS. 4 and 5.

FIG. 4 is a diagram showing one example of the characteristic function of the conventional set (crisp set).

In the case of the crisp set, a border line or threshold value is provided, and it is determined whether given data is larger or smaller than the threshold value, to determine whether or not the data belongs to a certain set. Accordingly, the case where a given data spreads across the threshold value can not be taken into consideration. That is, the characteristic function can take only "1" (belonging) or "0" (not belonging).

FIG. 4 shows a characteristic function in which the data or element is "stature", and persons who are more than 170 cm tall belong to a set of "taller persons". The functional value "1" means that the data belongs to the set of "taller persons"; and the functional value "0" means that the data does not belong to the set of "taller persons".

The characteristic function of the fuzzy set is called "a membership function". FIG. 5 shows one example of the membership function of the fuzzy set.

In the membership function, the functional value takes not only "1" and "0", but also a value therebetween, for instance, "0.8". The functional value "1" means that the data belongs 100% to the set; the functional value "0.8" means that the data belongs 80% to the set but not 20%; and the functional value "0" means that the data belongs 0% to the set (not belonging to it at all).

Similarly as in FIG. 4, in FIG. 5 the element is "stature".

In this membership function, a functional value "0.2" is provided for a stature of 165 cm, that is, the person who is 165 cm tall belongs 20% to the set of "taller persons"

On the other hand, a functional value "0.8" is provided for a person who is 170 cm tall. This means that the person who is 170 cm tall belongs 80% to the set of "taller persons".

Most of the research on the fuzzy logic is applied to software systems using digital computers, however, it is necessary to use an exclusive hardware system for fuzzy logic operation, in order to process a more intricate system at a high speed.

The hardware system may be formed by digital circuits or analog circuits. However, in view of the combination with a current digital computer, it is preferable to employ digital circuits to form the hardware system.

In the case where a fuzzy logic operation is carried out with a digital circuit, several function values are provided between the functional values "1" and "0", and the membership function is approximated with a step-formed curve (corresponding to the discrete of the membership function), and a digital operation is carried out for each of the functional values or levels. That is, in practice, the processing is carried out with multi-valued data instead of binary data. As the number of functional values is increased, the approximation is increased in precision, and the fuzzy logic operation is also increased in accuracy.

FIG. 6 shows one example of the case where the membership function of the fuzzy set is approximated by providing a plurality of levels. In the case of FIG. 6, the number of levels is eight (0 through 7). In FIG. 6, reference character a designates the membership function; b, step-formed approximation curve; and $E_0$ through $E_{10}$, the values of elements.

The membership function is approximated with the curve b. Therefore, for instance, when the element is $E_7$, the level is "6" (the corresponding functional value of the membership function being 6/7).

Further, one operation is performed by one exclusive digital circuit. Therefore, a digital circuit which outputs a level of "5" when an element value $E_6$ is inputted is provided. Similarly, a digital circuit which outputs a level of "4" when an element value $E_5$ is inputted is provided.

By integrating the above-described operations, the approximation of the membership function is achieved with the digital circuits.

Reference materials for the above-described fuzzy set and membership function are, for instance, Japanese Patent Application (OPI) No. 95673/1987 (the term "OPI" as used herein means an "unexamined published application") and M. Togai and H. Watanabe "A VLSI IMPLEMENTATION OF FUZZY INFERENCE ENGINE: TOWARD AN EXPERT SYSTEM ON A CHIP" Proc. of the 2nd Conf. on Art. Int. Appli., pp. 192–197 Miami Beach, 1985.

The above-described fuzzy logic operation in which the membership function is approximated by providing a plurality of levels, and one exclusive digital circuit is provided for each operation suffers from the following difficulties:

The first difficulty is that, if the number of levels is increased, then the approximation is improved in accuracy; however, it follows that the number of kinds of fuzzy logic operations is increased as much and accordingly the number of exclusive arithmetic circuits is also increased.

The second difficulty resides in that, if the exclusive arithmetic circuits are made up of hardware, then the contents of operation cannot be changed any longer.

The first difficulty will be described in more detail.

FIGS. 7(a) through 7(d) are diagrams showing the fact that, where two levels are provided for input, there are sixteen (16) 2-input 1-output operators (or operation methods).

FIG. 7(a) shows the arrangement of an arithmetic circuit. In FIG. 7(a), reference numeral 70 designates a first input signal line; 71, a second input signal line; 72, the arithmetic circuit; and 73, an output signal line. In this case, two levels; i.e., "0" and "1" are provided for one input. A short line laid across the input signal line 70 and a numeral "1" mean that a 1-bit signal is applied through the signal line. This is applied to the other signal lines in FIG. 7 and to signal lines in the other figures.

FIG. 7(d) shows the combination of the inputs and outputs of the arithmetic circuit. The number of combinations of the first and second inputs are four (4) because each input has two levels (0 and 1). For the four combinations there are provided sixteen (16) output combinations No. 1 through No. 16 as shown in FIG. 7(d).

FIGS. 7(b) and 7(c) show the relationships between input and output in the output combinations No. 6 and No. 12, respectively. For instance, FIG. 7(b) shows the fact that, when the first input over the first input signal line 70 is "0" and the second input over the second input signal line 71 is "1", the output signal line 73 provides an output "1". That is, the arithmetic circuit for performing the operation of No. 6 is designed to operate as described above.

As is apparent from the above description, for two input levels, there are provided sixteen 2-input 1-output operators. Hence, in order to perform any operation, it is fundamentally necessary to provide sixteen exclusive logic circuits.

In general, when the number of input levels is n, there are $n^{n^2}$ 2-input 1-output operators. For instance, with n=3, the number of 2-input 1-output operators is 19,683, and it is necessary to provide 19,683 exclusive logic circuits. Thus, in a fuzzy logic operation in which the number of levels is infinite, it is necessary to provide an extremely large number of exclusive logic circuits.

Now the second difficulty will be described in more detail.

Recently, extensive research has been conducted on the fuzzy logic, and there is a high possibility of developing and utilizing a number of useful fuzzy logic operations. In this connection, there has been a demand for provision of a fuzzy logic circuit which is so flexible that the contents of operation can be readily changed.

However, the demand cannot be filled by the above-described exclusive arithmetic circuit which cannot change the contents of operation when made up of hardware.

SUMMARY OF THE INVENTION

Accordingly, an object of this invention is to eliminate the above-described difficulties accompanying a conventional fuzzy logic operation.

The foregoing object and other objects of the invention has been achieved by the provision of a programmable fuzzy logic circuit which, according to the invention, comprises: an operation section memory unit in which the result of operation to be outputted in response to an input is stored in an address which is specified by the input, the result of operation being rewritable.

Therefore, with the fuzzy logic circuit of the invention, the change in the content of a fuzzy logic operation can be handled without providing an exclusive arithmetic circuit additionally.

In the operation section memory unit, the result of operation performed in response to an input is stored in the address specified by the input. Therefore, the result of operation of the fuzzy logic operation can be obtained merely by reading the data stored in the address.

The result of operation can be rewritten. Therefore, by rewriting it, another fuzzy logic operation can be performed. Thus, provided according to the invention is a programmable fuzzy logic circuit in which the result of operation is rewritten successively according to the program.

The nature, principle and utility of the invention will become more apparent from the following detailed description and the appended claims when read in conjunction with the accompanying drawings in which like parts are designated by like reference numerals.

BRIEF DESCRIPTION OF THE DRAWINGS

In the accompanying drawings:

FIGS. 3(a) and 3(b) are explanatory diagrams for a description of the functions of the output bits $A_6$ and $A_7$ of a counter shown in FIG. 2;

FIG. 4 is an explanatory diagram showing one example of the characteristic function of a conventional set (crisp set);

FIG. 5 is an explanatory diagram showing one example of the membership function of a fuzzy set;

FIG. 6 is an explanatory diagram showing one example of the approximation of the fuzzy set by using a plurality of levels;

DETAILED DESCRIPTION OF THE INVENTION

Preferred embodiments of this invention will be described with reference to the accompanying drawings.

Figure 1:
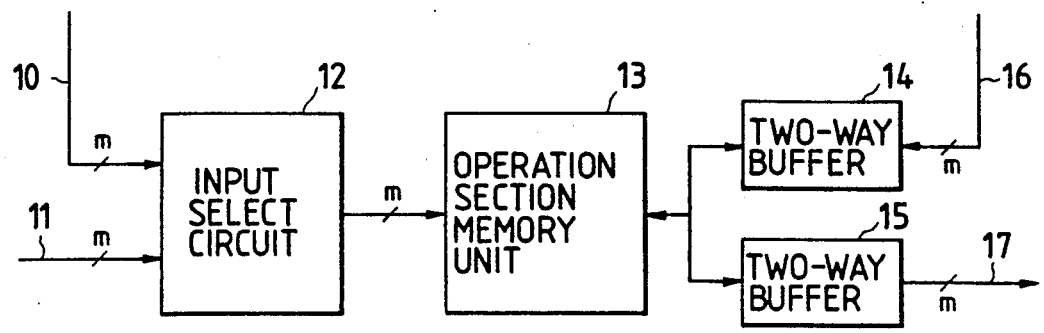
FIG. 1 is a block diagram showing the fundamental arrangement of an essential part of a programmable fuzzy logic circuit according to this invention.

FIG. 1 shows a block diagram showing the fundamental arrangement of an essential part of a programmable fuzzy logic circuit according to the invention.

In FIG. 1, reference numeral 10 designates a programming address signal line; 11, an input signal line; 12, an input select circuit; 13, a memory unit for an operation section; 14 and 15, two-way buffers; 16, a programming data signal line; and 17, output signal line.

The reference character "m" provided along the signal lines means that the signal lines are of m-bit parallel. The value m depends on the maximum value N (7 in FIG. 6) of the levels dividing the membership function; that is, it is so selected as to conform $N=2^m-1$.

The input select circuit 12 operates to select one of the inputs provided over the programming address signal line 10 and the input signal line 11, and send it to the memory unit 13. The input select circuit 12 comprises, for instance, a multiplexer.

The operation section memory unit 13 is so designed as to provide an operation output according to a so-called "look-up table system". That is, an m-bit signal is applied to the memory unit 13, and it is used as data for specifying an address in the memory unit 13. The result of the output operation carried out in response to the input has been written in an address in memory in advance. Therefore, when the address is specified by the input, the result of the output operation is read from the address, to provide the desired output operation.

The result of the output operation is written in memory unit 13 as follows:

The input select circuit 12, in this case, selects the input provided over the programming address signal line 10, and applies it to the memory unit 13. The input thus applied specifies an address in the memory unit 13. Data (or the result of operation) to be written in the address thus specified is delivered through the programming data signal line 16. Therefore, in this operation, the two-way buffer 14 is so controlled as to transmit the data to the memory unit 13. Thus, the data provided through the programming data signal line 16 is stored in the address specified by the signal provided over the programming address signal line 10.

The output operation using memory unit 13 is carried out as follows:

In the output operation, the input select circuit 12 operates to select the input signal provided through the input signal line 11. The two-way buffer 14 is turned off, whereas the two-way buffer 15 is so controlled as to transmit the signal from the memory unit 13 to the output signal line 17.

The input applied through the input signal line 11 is employed as an address signal to specify an address in the memory unit 13. As a result, the data (or the result of operation) which has been stored in the address thus specified is applied through the two-way buffer 15 to the output signal line 17. Thus, the result of the output operation has been obtained (read out).

The logic circuit shown in FIG. 1 is of 1-input 1-output. However, it may be modified into a 2-input 1-output logic circuit by adding another input signal line similar to the input signal line 11, and by using a programming address signal line of 2m-bit parallel instead of the programming address signal line 10.

In FIG. 1, the two-way buffers 14 and 15, and the input select circuit 12 may be eliminated.

Figure 2:
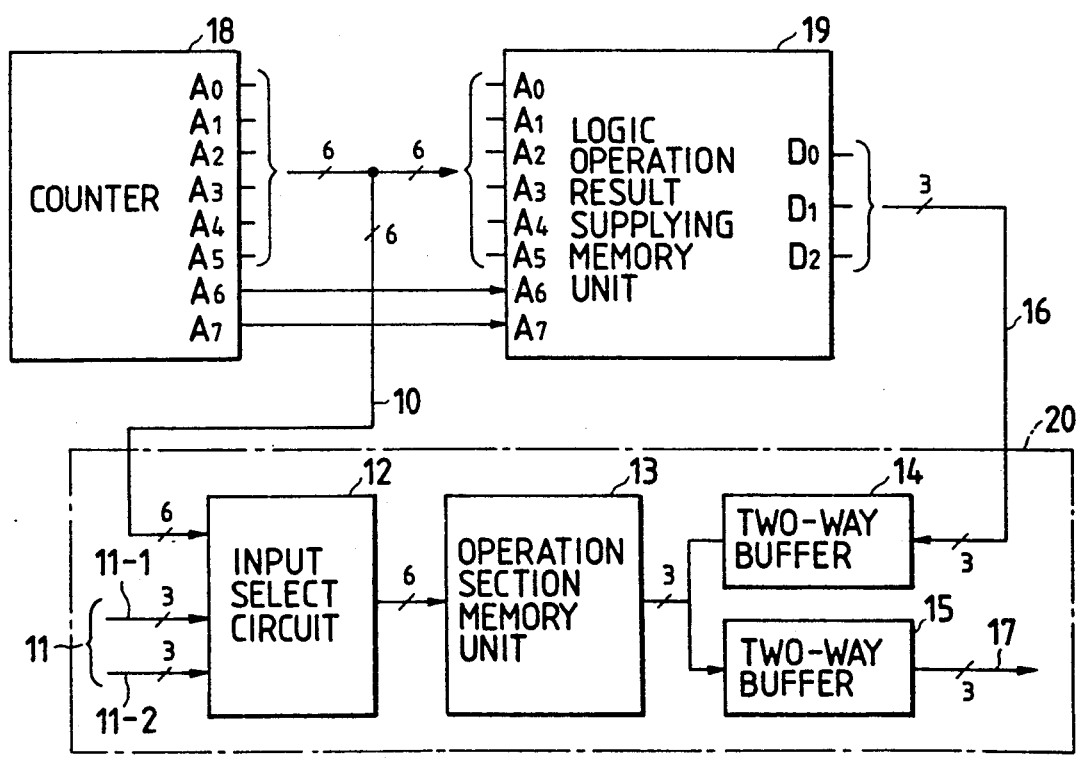
FIG. 2 is a block diagram showing the arrangement of one example of the programmable fuzzy logic circuit according to the invention.

FIG. 2 shows one example of a programmable fuzzy logic circuit according to the invention. In FIG. 2, the circuit elements which have been previously described with reference to FIG. 1 are therefore designated by the same reference numerals or characters. Further in FIG. 2, reference numeral 18 designates a counter; 19, a logic operation result supplying memory unit (hereinafter referred to as "a second memory unit 19", when applicable); and 20, the essential part corresponding to that shown in FIG. 1.

In the case of FIG. 2, a 6-bit parallel signal is used to specify an address in the operation section memory unit 13 (hereinafter referred to as "a first memory unit 13", when applicable), and therefore the number of addresses which can be specified is $2^6=64$.

A 2-input system is employed. That is, the input signal line 11 consists of a first input signal line 11-1 and a second input signal line 11-2. The two inputs specify an address in the first memory unit 13, and therefore each input signal line provides a 3-bit parallel signal.

The second memory unit 19 is to provide a plurality of sets including membership function results which are to be written in the first memory unit 13. That is, when it is required to change the contents of fuzzy logic operation, the second memory unit 19 supplies to the first memory 13 one of the plurality of sets including result of operation suitable for that operation.

The counter 18 operates to produce an address signal for writing the result of operation in the first memory unit 13. The address signal thus produced is applied through the input select circuit 12 to the first memory unit 13 to specify an address where the data should be written, and it is supplied to the second memory unit 19 to inform it of the address where the data to be written is stored.

In the first memory unit 13, an address can be specified with six (6) bits; whereas the counter outputs an 8-bit signal ($A_7-A_0$) larger by two bits. The two high-order bits; i.e., the surplus two bits ($A_7, A_6$) output (or a control signal) is applied to the second memory unit 19 only so as to divide the results of operation into groups or sets as shown in FIG. 3.

FIGS. 3(a) and 3(b) are diagrams for a description of the functions of the counter output bits $A_6$ and $A_7$. FIG. 3(a) shows that there are four combinations (a, b, c and d) of the two high-order bits.

Sixty-four (64) addresses can be specified with the low-order bits, that is, an address signal consisting of the remaining six bits ($A_5-A_0$). Therefore, the control signal consisting of the two high-order bits acts to divide the address region into four regions a, b, c and d each having sixty-four (64) addresses, as shown in FIG. 3(b).

That is, the second memory unit 19 operates to select the contents in the region a, b, c or d so that the contents thus selected are written in the first memory unit 13. That is, the contents of operation can be changed according to the program.

The second memory unit 19 has output terminals $D_0$ through $D_2$, and the output is of 3-bit parallel.

The number of input levels is $2^3=8$ because the first and second input signal lines 11-1 and 11-2 are of 3-bit parallel. This corresponds to the case where, as shown in FIG. 6, the membership function of the fuzzy set is divided into eight levels 0 through 7.

Figures 7A, 7B, 7C, 7D, 8:
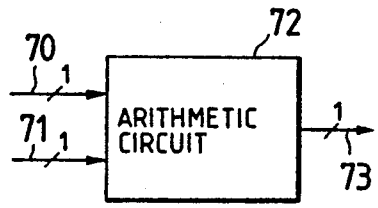
FIGS. 7(a) through 7(d) are explanatory diagrams for a description of the fact that, when two levels are provided for one input, there are sixteen 2-input 1-output operators.
FIG. 8 is a diagram showing a 2-input 1-output operator input and output table in the case where the number of input level is eight.

On the other hand, the output of the first memory unit 13 is of 3-bit parallel, and therefore eight kinds of outputs 0 through 7 are provided. In such a case, one example of the input and output relationship of the fuzzy logic circuit is, for instance, as follows:

FIG. 8 shows one example of a 2-input 1-output operator input and output table in the case where the number of input levels is eight (8).

In FIG. 8, the output of the first memory unit 13 can be found at the intersection of the first input's level and the second input's level. For instance when the first input's level and the second input's level are "4" and "6", respectively, the output is "4". This input and output table is for the logic circuit called "a minimum circuit" which outputs the smaller of two inputs, and it is merely one of the extremely large number of ($n^{n^2}$, where n=8) input and output tables which can be taken into account as was described above.

The operation section memory unit 13 and the logic operation result supplying memory unit 19 may be RAMs (random access memories), EPROMs (ultraviolet-ray erasable/programmable read-only memories), E²PROMs (electrically erasable/programmable read-only memories), or flip-flop circuits. As the case may be, ROMs (read-only memories) may be used. Alternatively, the logic operation result supplying memory unit 19 may be eliminated, and instead programming may be made directly through a digital computer.

In the above-described embodiment, the logic circuit performing fuzzy logic operation is made up of the memory means, and the result of operation is obtained according to the look-up table system, with the result that the logic operation to be performed can be free changed in kind; i.e., the logic operation is programmable.

The membership function is stored in the memory means. On the other hand, in a fuzzy inference system, its essential part is made up of a membership function section and a fuzzy logic operation section. Therefore, the essential part can be made up of memory means in its entirety. This means, both of the membership function section and fuzzy logic operation section can be made programmable. Such an application will be described in detail.

Figure 9:
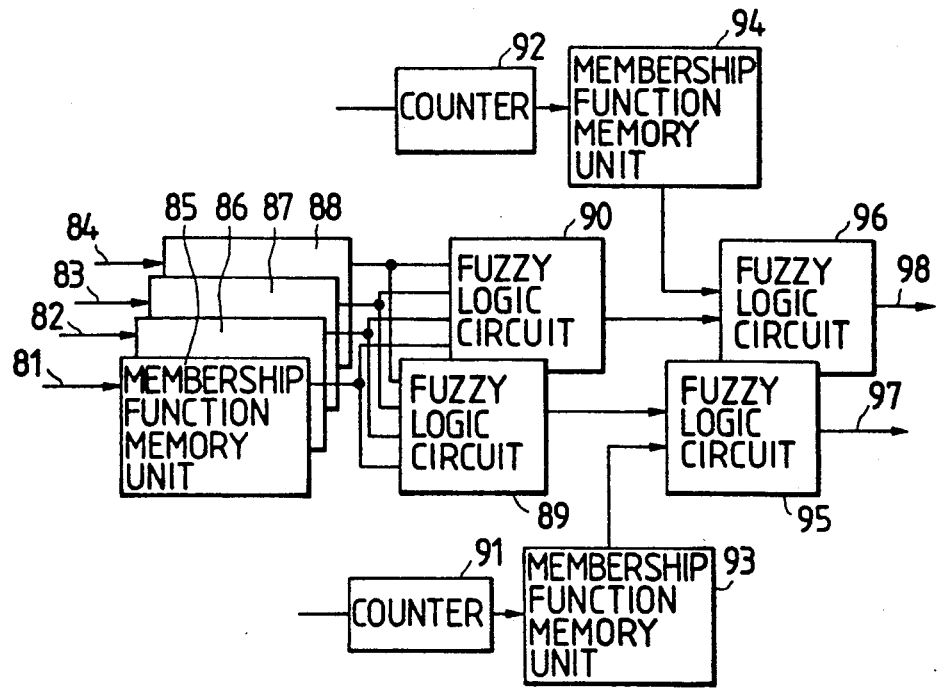
FIG. 9 is a block diagram showing the arrangement of a conventional fuzzy inference system.

FIG. 9 shows one example of a conventional fuzzy inference system. In FIG. 9, reference numerals 81 through 84 designate input signal lines; 85 through 88, membership function memory units; 89 and 90, fuzzy logic circuits; 91 and 92, counters; 93 and 94, membership function memory units; 95 and 96, fuzzy logic circuits; and 97 and 98, output signal lines.

The fuzzy inference system has four input signal lines 81 through 84 and two output signal lines 97 and 98. Therefore, in the system, with four inputs and two outputs one fuzzy production rule is carried out.

The fuzzy logic circuits 89, 90, 95 and 96 are made up of exclusive logic circuits.

The fuzzy inference system thus organized operates as follows:

A signal corresponding to the element shown in FIG. 6 is applied through the input signal 81 to the membership function memory unit 85, in which a predetermined membership function has been stored, and the memory unit 85 provides an output in correspondence to the input signal. The remaining membership function memory units 86 through 88 operate in the same manner as the membership function unit 85.

The fuzzy logic circuits 89 and 90 are so designed as to perform predetermined fuzzy AND operations. Each of the fuzzy logic circuits 89 and 90 receives four inputs from the membership function memory units 85 through 88, and outputs one output.

The fuzzy inference system comprises a so-called "condition section" (or former condition section) and a so called "result section" (or latter condition section). The "condition section" covers from the input signal lines 81 through 84 to the fuzzy logic circuits 89 and 90, and the "result section" covers the remaining.

The outputs of the condition section are applied to the fuzzy logic circuits 95 and 96 in the result section, where predetermined fuzzy AND operations are carried out. The outputs of the membership function memory units 93 and 94 are also applied to the fuzzy logic circuits 95 and 96, respectively.

The output signals of the counters 91 and 92 are supplied to the membership function memory units 93 and 94, respectively. More specifically, each counter produces signals, which correspond to the elements of the membership function stored in the respective membership function memory unit, in the order of increase (or decrease) of the elements. In response to the signals thus produced, the corresponding membership function values are successively outputted.

In the fuzzy logic circuits 95 and 96, the outputs of the condition section and the membership function values outputted successively by the membership function memory units 93 and 94 are subjected to fuzzy AND operation, and the outputs of the fuzzy logic circuits 95 and 96 are supplied to their output signal lines 97 and 98, respectively.

Figure 10:
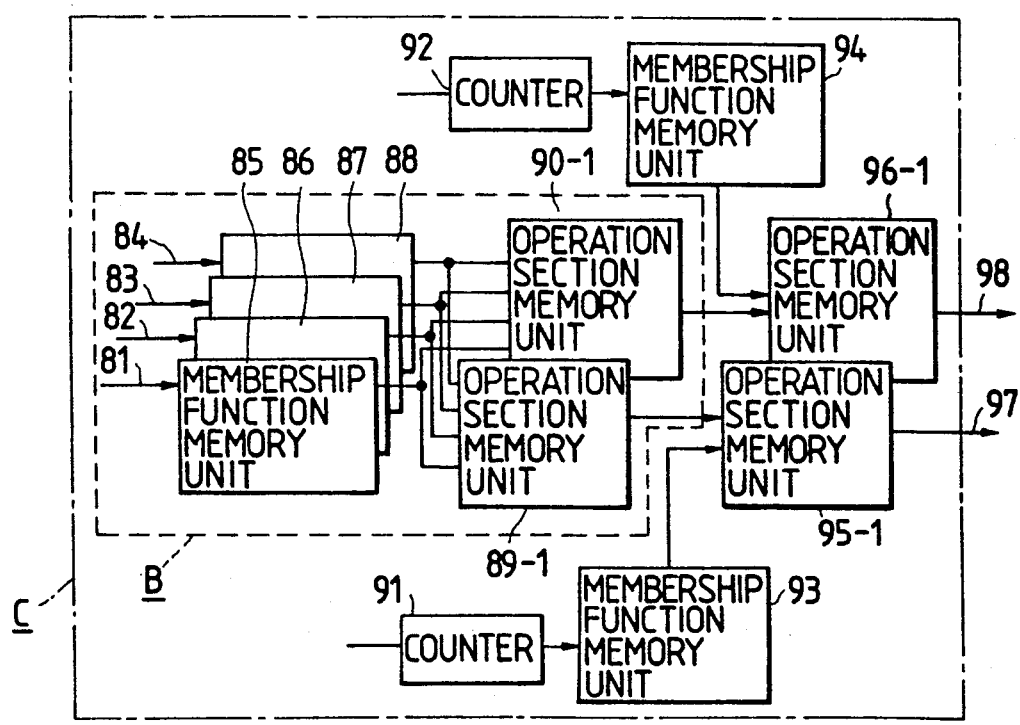
FIG. 10 is a block diagram showing the arrangement of a fuzzy inference system to which the technical concept of the invention is applied.

One example of a fuzzy inference system to which the technical concept of the invention is applied is as shown in FIG. 10, in which those circuit elements which have been already described with reference to FIG. 9 are therefore designated by the same reference numerals. In FIG. 10, reference characters 89-1, 90-1, 95-1 and 96-1 designate operation section memory units; B, a condition section; and C, the fuzzy inference system.

As is apparent from comparison of FIGS. 9 and 10, the fuzzy inference system according to the invention is different from the conventional fuzzy inference system in that the fuzzy logic circuits 89, 90, 95 and 96 are replaced by the operation section memory units 89-1, 90-1, 95-1 and 96-1.

The method of making each fuzzy logic circuit programmable by replacing it with an operation section memory unit has been already described. In this application, the circuit elements forming the fuzzy inference system are divided into a few groups, and the groups are made programmable according to the method described with reference to FIGS. 1 and 2.

For instance, the condition section B surrounded by the dotted line may be made programmable, or the fuzzy inference system C surrounded by the one-dot chain line may be made programmable. Of course, it is possible to make only the result section (which is the remainder of the fuzzy inference system C after excluding the condition section B) programmable.

In the practical application of fuzzy inference, in general several tens of fuzzy inference systems C are connected in parallel. Those fuzzy inference systems C thus connected may be made programmable as a whole.

Figure 11:
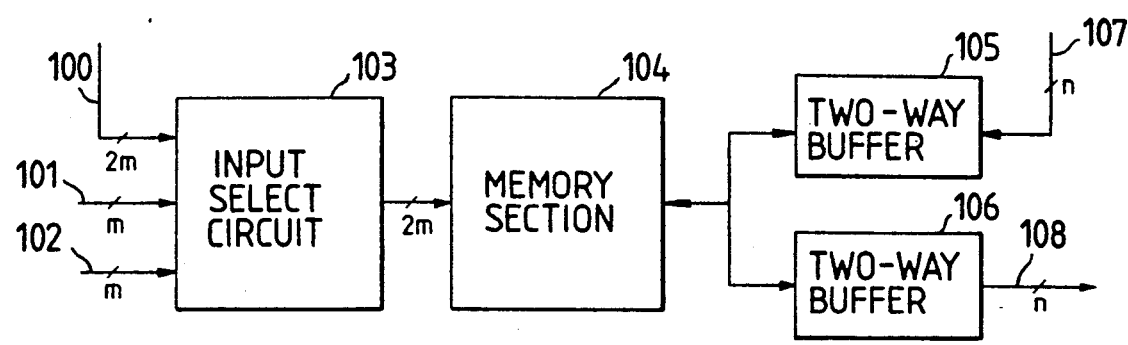
FIG. 11 is a block diagram for a description of the principle of making a fuzzy inference system programmable.

FIG. 11 is a diagram for a description of the fundamental principle of making a fuzzy inference system programmable. In FIG. 11, reference numeral 100 designates a programming address signal line; 101 and 102, input signal lines; 103, an input select circuit; 104, a memory section; 105 and 106, two-way buffers; 107, a programming data signal line; and 108, an output signal line. Thus, FIG. 11 corresponds to FIG. 1 in arrangement.

In the case of making the condition section B programmable, the memory section 104 covers the membership function memory units 85 through 88 and the operation section memory units 89-1 and 90-1. In the case of making the fuzzy inference system programmable in its entirety, in addition the membership function memory units 93 and 94 and the operation section memory units 95-1 and 96-1 are included.

In setting data in these circuit elements in advance, the input select circuit 103 selects the programming address signal line 100. The signal provided through the programming address signal line 100 is to specify an address in the membership function memory unit 85, 86, 87 or 88 or in the operation section memory units 89-1 or 90-1.

The data supplied through the two-way buffer 105 from the programming data signal line 107 is stored in the address thus specified by the signal provided through the programming address signal line 100. The programming data signal line 107 is used to supply data signals to the membership function memory unit 85 etc. or to the operation section memory unit 89-1 etc.

In performing a fuzzy logic operation, the input select circuit 103 selects the input signal lines 101 and 102. In the case of FIG. 11, two inputs are provided; however, it should be noted that the number of inputs is not limited to only two. With the input signal as address, the output of the membership function memory unit is taken out. Similarly, in the operation section memory unit, with the input signal as address, the result of operation is read according to the look-up table system.

The outputs thus obtained are applied through the two-way buffer 106 to the output signal line 108.

As is apparent from the above description, the invention has the following effects or merits:

(1) In order to satisfactorily approximate a fuzzy logic operation with a digital circuit, a number of levels are employed; however, according to the invention, in this case, the number of operation section memory sections may be only one.

Heretofore, as was described before, if the number of levels is increased, then the approximation is improved in accuracy; however, it follows that the number of kinds of fuzzy logic operations is increased as much and accordingly the number of exclusive arithmetic circuits is also increased. On the other hand, in the invention, the change in the contents of a fuzzy logic operation to be performed can be handled merely by rewriting the contents of data in the operation section memory unit.

(2) Intensive research has been conducted on the fuzzy logic, and there is a high possibility of using the fuzzy logic operations which have not been used. Such fuzzy logic operations can be readily utilized merely by rewriting the contents of the operation section memory unit according to the invention.

(3) The essential parts of the fuzzy inference system can be made up of memory means, and can be made programmable, according to the invention.

While there has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A programmable fuzzy logic circuit, responsive to externally supplied input signals, comprising:
    logic operation result memory means for storing predetermined fuzzy logic operation results, said logic operation result memory means storing a plurality of sets of predetermined fuzzy logic operation results, each of said plurality of sets having different fuzzy logic operation results;
    operation section memory means for storing one of said sets of fuzzy logic operation results from the logic operation result memory means and for outputting as data said fuzzy logic operation results in accordance with the inputs signals;
    first input signal selection means, responsive to the input signals, for selecting one of a plurality of the input signals for use in writing data from said logic operation result memory means to said operation section memory means;
    memory writing means for writing one of said sets of fuzzy logic operation results into said operation section memory means at an address corresponding to the input signal selected by said first input signal selection means; and
    second input signal selection means, responsive to the input signals, for selecting one of a plurality of the input signals for controlling said operation section memory means to output data.

2. A programmable fuzzy logic circuit as claimed in claim 1, further including a counter for supplying said input signals.

3. The programmable fuzzy logic circuit of claim 1, wherein the operation section memory means further comprises one of a random access memory, and a plurality of flip-flop circuits.

4. The programmable fuzzy logic circuit of claim 1, wherein the input signals supplied by said input signal supplying means are A bits long with a plurality of B high-order bits and a plurality of C low-order bits, wherein the high-order B bits are used as an address into said logic operation result memory means, and said low-order C bits are used as an address into said operation section memory means, wherein $A = B + C$.

5. The programmable fuzzy logic circuit of claim 1, wherein the operation section memory means further comprises an electrically erasable/programmable read-only memory.

* * * * *